(12) United States Patent
Laprade

(10) Patent No.: US 9,643,683 B2
(45) Date of Patent: May 9, 2017

(54) ELECTRIC BICYCLE AND PROPULSION SYSTEM THEREFOR

(71) Applicant: PROPULSION POWERCYCLE INC., Saint-Georges-de-Beauce (CA)

(72) Inventor: Paul Laprade, Delson (CA)

(73) Assignee: PROPULSION POWERCYCLE INC., Saint-Georges-de-Beauce (CA)

( * ) Notice: Subject to any disclaimer, the term of this patent is extended or adjusted under 35 U.S.C. 154(b) by 0 days.

(21) Appl. No.: 14/740,818

(22) Filed: Jun. 16, 2015

(65) Prior Publication Data

US 2015/0360748 A1    Dec. 17, 2015

Related U.S. Application Data

(60) Provisional application No. 62/012,542, filed on Jun. 16, 2014.

(51) Int. Cl.
*B62M 6/70* (2010.01)
*H02K 7/10* (2006.01)
*B62M 6/55* (2010.01)

(52) U.S. Cl.
CPC .............. *B62M 6/70* (2013.01); *B62M 6/55* (2013.01); *H02K 7/1004* (2013.01); *Y10T 29/49718* (2015.01)

(58) Field of Classification Search
CPC ......... B62M 6/70; B62M 6/55; H02K 7/1004; Y10T 29/49718
See application file for complete search history.

(56) References Cited

U.S. PATENT DOCUMENTS 729,197 A    5/1903  Mathieu
5,826,675 A * 10/1998 Yamamoto .............. B62M 6/55
                                                     180/220

(Continued)

FOREIGN PATENT DOCUMENTS

CN       2401447 Y    10/2000
CN     201447041 U     5/2010

(Continued)

OTHER PUBLICATIONS

European Search Report, Application No. EP 15172283, Oct. 12, 2015.

*Primary Examiner* — Joseph Rocca
*Assistant Examiner* — Marlon A Arce
(74) *Attorney, Agent, or Firm* — Norton Rose Fulbright Canada LLP

(57) ABSTRACT

An electric propulsion system, an electric bicycle, and a method for converting a non-electric bicycle into an electric bicycle are disclosed. The electric propulsion system has an electric motor with a motor output shaft rotatable about a motor shaft axis. An output end of the motor output shaft is disposed on a first side. A transmission interconnects the electric motor and a drive chain of the bicycle to transmit a drive of the electric motor to the rear wheel. The transmission has a rotatable driven member on the first side engaged with the output end and is rotated thereby. A drive sprocket on the second side and rotatable about a drive sprocket axis is connected to the driven member by a transmission shaft. The drive sprocket engages the drive chain to transmit the drive of the electric motor thereto.

18 Claims, 10 Drawing Sheets

(56) References Cited

U.S. PATENT DOCUMENTS

| | | | |
|---|---|---|---|
| 5,845,727 A * | 12/1998 | Miyazawa | B62M 6/55 180/206.4 |
| 5,915,493 A * | 6/1999 | Nakayama | B62M 6/40 180/206.4 |
| 5,964,332 A | 10/1999 | King | |
| 6,836,037 B1 | 12/2004 | Tsuboi | |
| 8,251,389 B2 | 8/2012 | Juan | |
| 2009/0266636 A1 | 10/2009 | Naegeli | |
| 2010/0051373 A1 | 3/2010 | Lee et al. | |
| 2013/0032425 A1 | 2/2013 | Lee et al. | |
| 2013/0233631 A1 | 9/2013 | Jauvtis | |

FOREIGN PATENT DOCUMENTS

| | | |
|---|---|---|
| DE | 102010009649 A1 | 9/2011 |
| DE | 102011077903 | 12/2012 |
| DE | 102012103355 | 10/2013 |
| EP | 2617636 | 7/2013 |
| JP | H09183395 A | 7/1997 |
| JP | 2001130476 A | 5/2001 |
| KR | 20130011281 A | 1/2013 |
| WO | 2011013109 | 2/2011 |
| WO | 2011113161 | 9/2011 |
| WO | 2013156445 | 10/2013 |

* cited by examiner

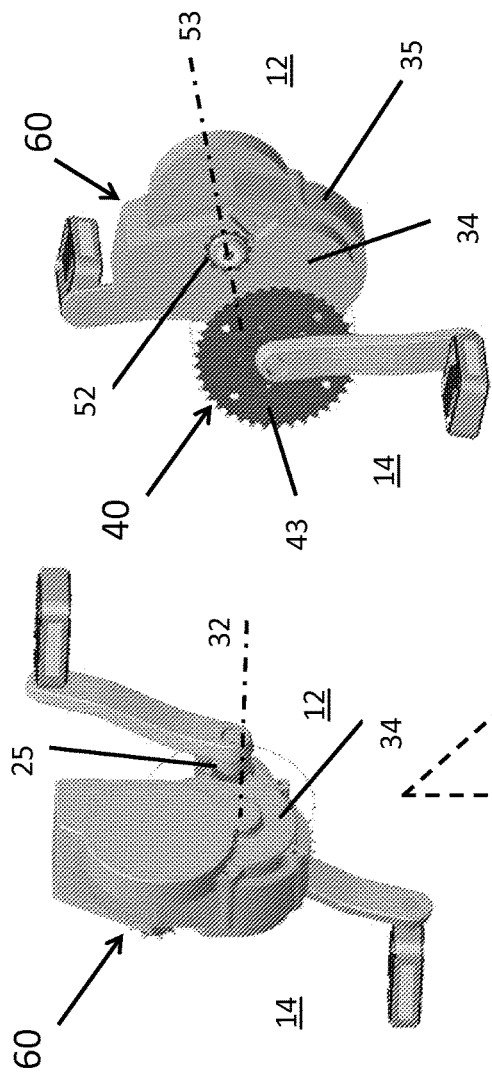
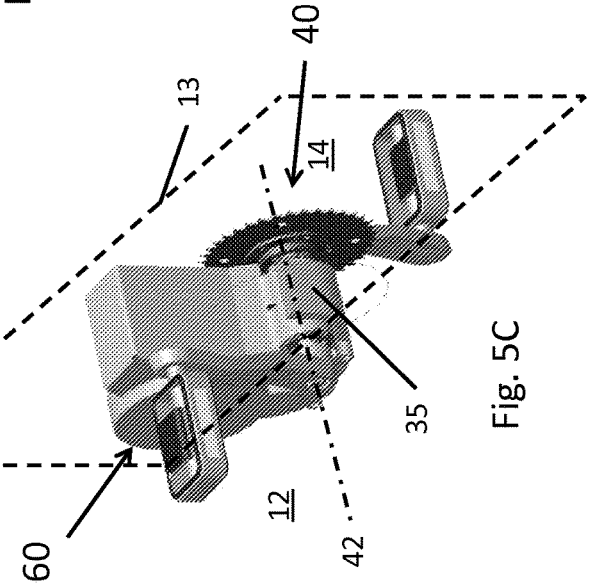
Fig. 5A
Fig. 5B
Fig. 5C

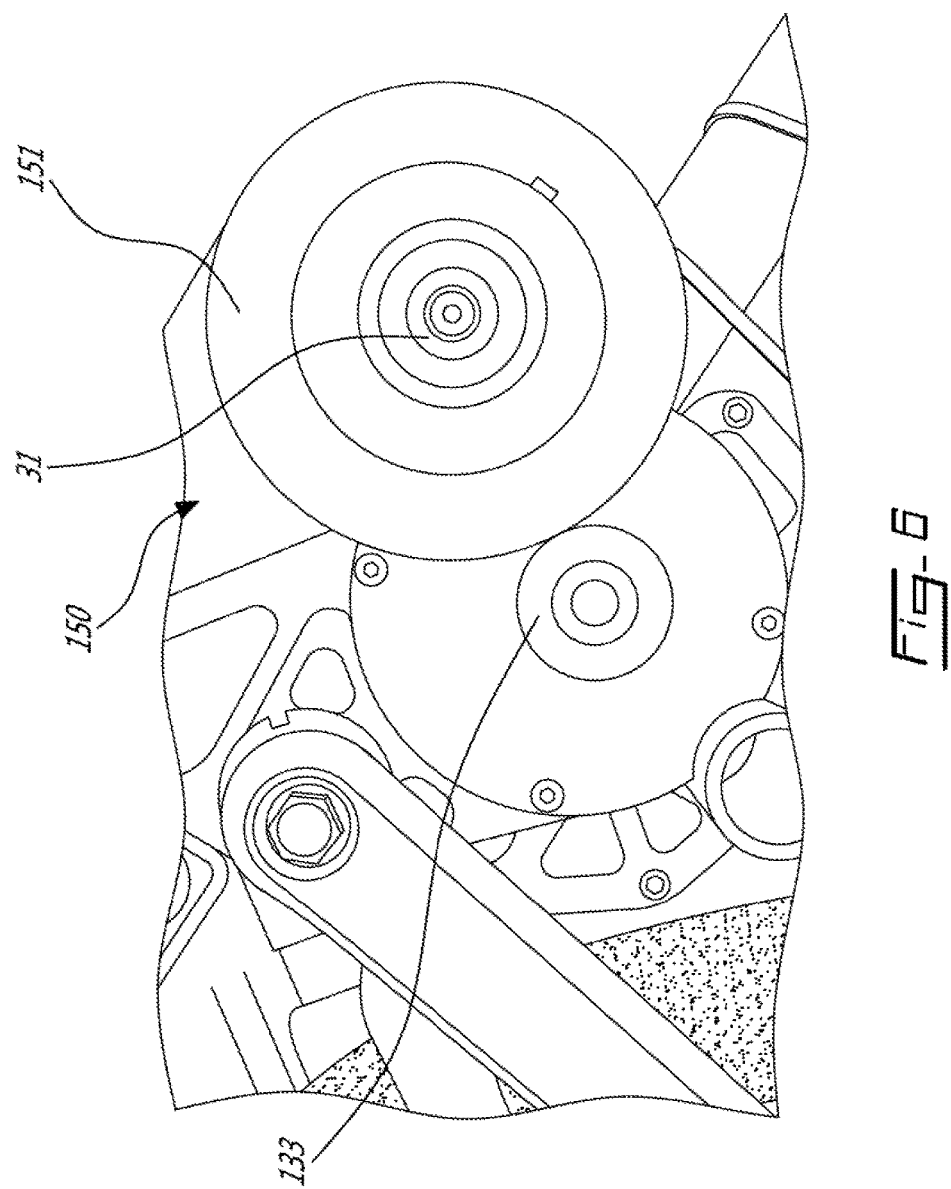

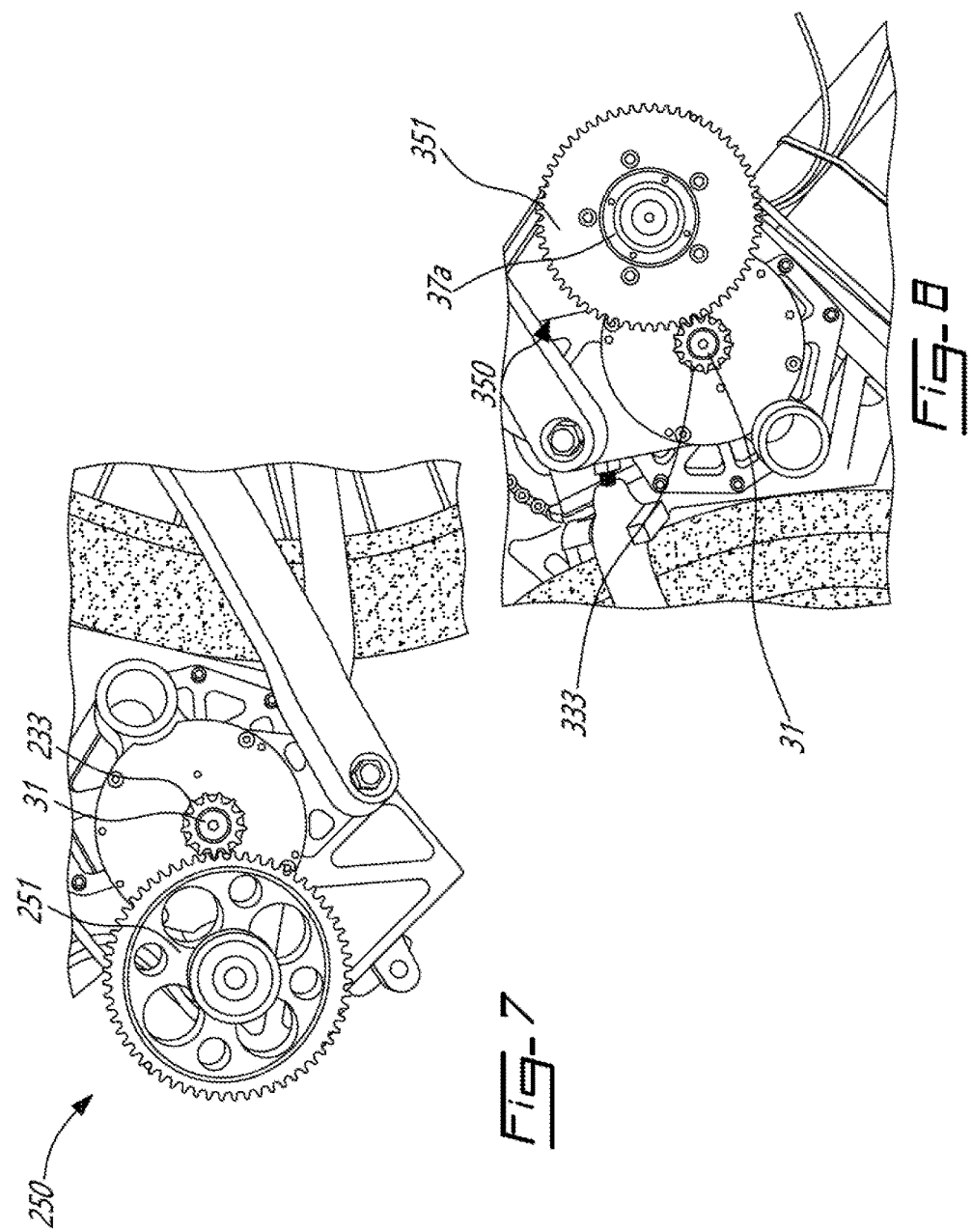

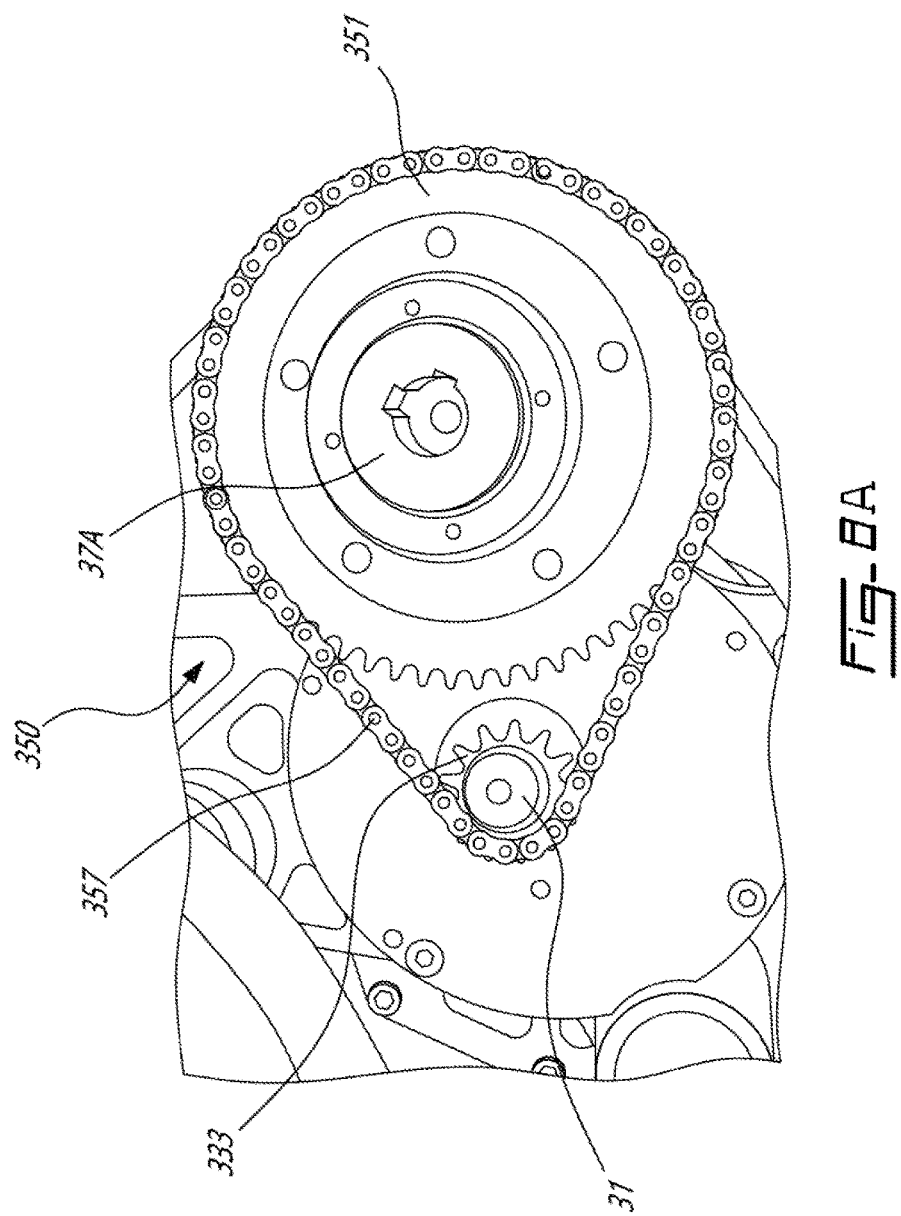

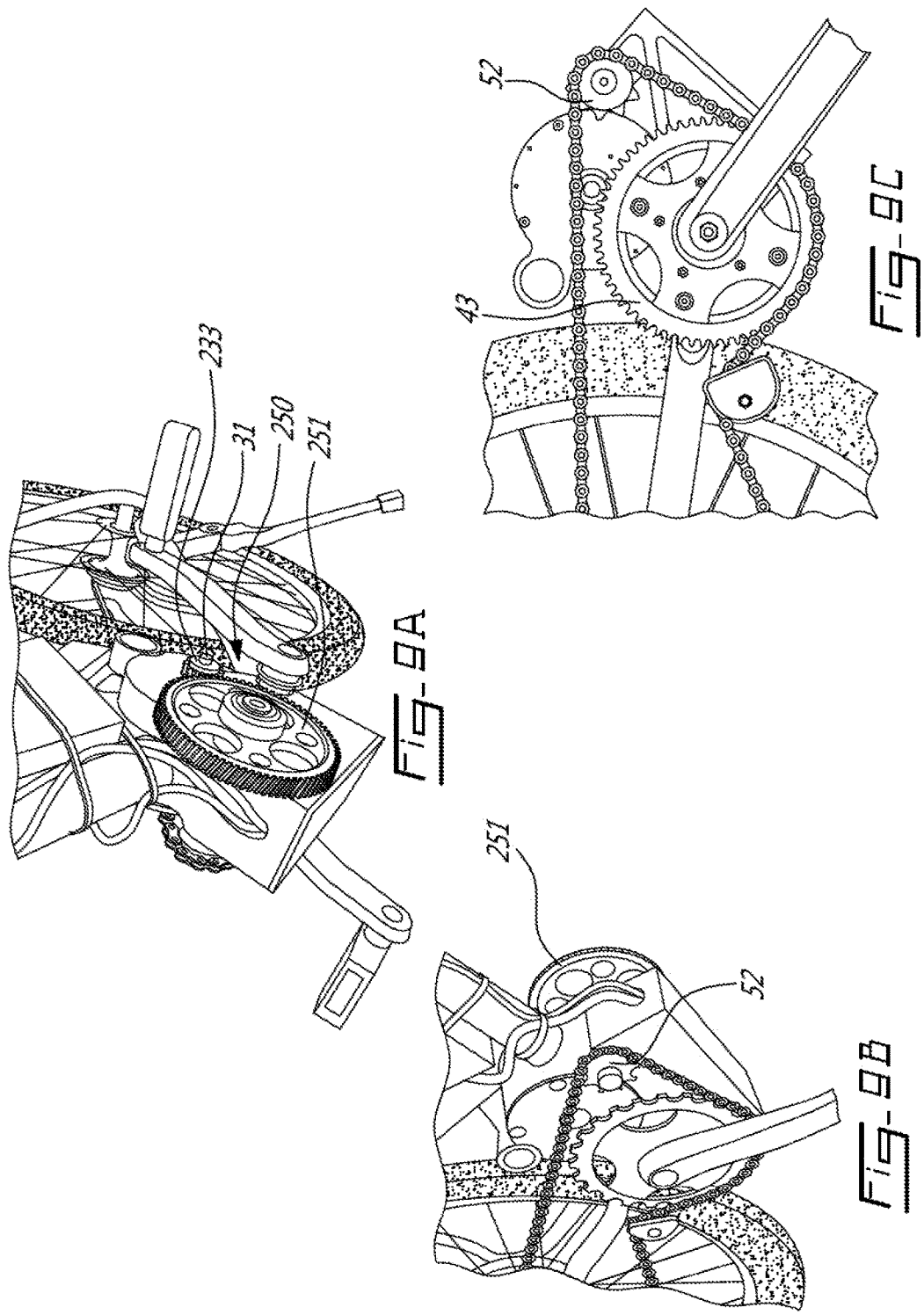

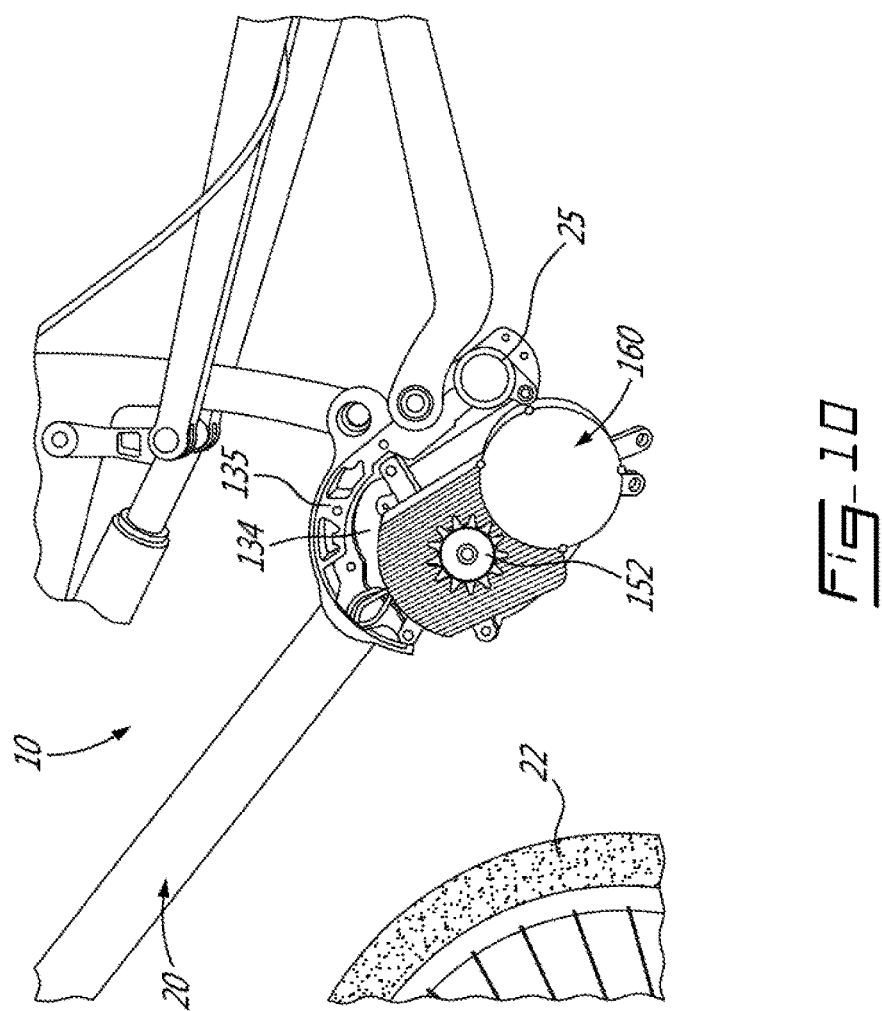

ELECTRIC BICYCLE AND PROPULSION SYSTEM THEREFOR

CROSS-REFERENCE TO RELATED APPLICATIONS

This application claims priority to U.S. provisional patent application No. 62/012,542 filed Jun. 16, 2014, the entire contents of which are incorporated by reference herein.

TECHNICAL FIELD

The application relates generally to bicycles, and more particularly, to electric bicycles.

BACKGROUND OF THE ART

Bicycles driven in whole or in part by assisted power are known in the art. The assisted power complements the driving force generated by the rider of the bicycle, and may replace it altogether. The assisted power can be provided by an internal-combustion or electric motor integrated with the bicycle.

Regardless of the source of the assisted power, the motor being used must be relatively compact and lightweight so that the bicycle is not too heavy or cumbersome to use. These gains in compactness and weight are generally achieved by using smaller motors. Smaller motors, however, are limited in the power they can provide. Furthermore, conventional transmission systems are limited in the amount of torque they can transmit, and thus could not be used with motors having greater power ratings. Therefore, many motors are often not used to their full capacity.

SUMMARY

In one aspect, there is provided an electric bicycle, comprising: a frame to which a front wheel and a rear wheel are rotatable mounted and having a bottom bracket shell fixed to a bottom end of the frame, a longitudinally extending centerline plane bisecting the frame and defining a first side and a second side of the bicycle disposed on opposed transverse sides of the plane; a drive train having a crank shaft extending between the first and second sides and mounted within the bottom bracket shell, a pedal crank mounted to the crank shaft on the second side, the crank shaft and the pedal crank being rotated about a common crank shaft axis by a pedaling actuation, and a drive chain extending between and engaging the pedal crank and a rear sprocket of the rear wheel to transmit the pedaling actuation to the rear wheel; and an electric propulsion system mounted to the frame, the electric propulsion system comprising: an electric motor having a motor output shaft rotatable about a motor shaft axis, the motor output shaft defining an output end on the first side; and a transmission interconnecting the electric motor and the drive chain to transmit a drive of the electric motor to the rear wheel, the transmission having a rotatable driven member disposed on the first side and rotatably engaged with the output end of the motor output shaft to be rotated by the drive of the electric motor, and a drive sprocket disposed on the second side and rotatable about a drive sprocket axis disposed forward of the crank shaft axis, the drive sprocket connected to the driven member by a transversely extending transmission shaft, the drive sprocket engaging the drive chain to transmit the drive of the electric motor thereto.

According to an embodiment, the electric propulsion system has a housing encasing the electric motor and the transmission, and a support bracket, the housing being mounted to the frame forward of the bottom bracket shell with the support bracket.

According to an embodiment, the drive sprocket axis is disposed forward of both the motor shaft axis and the crank shaft axis, and the motor shaft axis is disposed forward of the crank shaft axis.

According to an embodiment, the driven member has a greater diameter than a diameter of the output end of the motor output shaft, the rotatable engagement of the driven member and the motor output shaft increasing torque provided to the drive sprocket.

According to an embodiment, the drive train has a freewheel mounted concentrically between the crank shaft and the pedal crank on the second side to selectively engage the crank shaft.

According to an embodiment, a clutch bearing is provided and is operable to selectively engage either the motor output shaft or the transmission shaft, the clutch bearing forming part of the electric motor when the clutch bearing engages the motor output shaft and is mounted concentrically thereabout, and the clutch bearing forming part of the transmission when the clutch bearing engages the transmission shaft and is mounted concentrically about the drive sprocket axis between the transmission shaft and the driven member.

According to an embodiment, the drive train has an idler gear disposed between the pedal crank and the rear sprocket of the rear wheel, the idler gear keeping two segments of the drive chain about the rear sprocket oriented parallel to one another.

According to an embodiment, the electric motor has an operating capacity between about 250 W and about 2,000 W, and more particularly, between about 1,100 W and 2,000 W, and more particularly, about 1,500 W.

In another aspect, there is provided an electric propulsion system mountable to a bicycle have a frame to which are rotatable mounted a front wheel and a rear wheel, comprising: a housing mountable to the frame, the housing having a first side and a second side disposed on opposed transverse sides of a longitudinally extending centerline plane bisecting at least one of the housing and the frame; an electric motor disposed within the housing and having a motor output shaft rotatable about a motor shaft axis, the motor output shaft defining an output end disposed within the housing on the first side; and a transmission interconnecting the electric motor and a drive chain of the bicycle to transmit a drive of the electric motor to the rear wheel, the transmission having a rotatable driven member disposed within the housing on the first side and rotatably engaged with the output end of the motor output shaft to be rotated by the drive of the electric motor, and a drive sprocket disposed outside the housing on the second side and rotatable about a drive sprocket axis, the drive sprocket connected to the driven member by a transversely extending transmission shaft disposed within the housing, the drive sprocket engaging the drive chain to transmit the drive of the electric motor thereto.

According to an embodiment, the housing has a support bracket, the housing being mountable to the frame at a distance from a bottom bracket shell of the frame with the support bracket.

According to an embodiment, the drive sprocket axis is disposed forward of an axis of a bottom bracket shell of the frame.

According to an embodiment, the drive sprocket axis is disposed forward of the motor shaft axis, and the motor shaft axis is disposed forward of an axis of a bottom bracket shell of the frame.

According to an embodiment, the electric motor includes a clutch bearing mounted concentrically about the motor output shaft for selectively engaging the motor output shaft.

According to an embodiment, the electric motor has an operating capacity between about 250 W and about 2,000 W, and more particularly, between about 1,100 W and 2,000 W, and more particularly, about 1,500 W.

In yet another aspect, there is provided a method for converting a non-electric bicycle into an electric bicycle, the method comprising: providing an electric propulsion system comprising: an electric motor having a motor output shaft rotatable about a motor shaft axis, the motor output shaft defining an output end on a first side of the electric propulsion system; and a transmission having a rotatable driven member disposed on the first side and rotatably engaged with the output end of the motor output shaft to be rotated by a drive of the electric motor, and a drive sprocket disposed on a second side of the electric propulsion system and rotatable about a drive sprocket axis disposed forward of the motor shaft axis, the drive sprocket connected to the driven member by a transversely extending transmission shaft; mounting the electric propulsion system to a frame of the non-electric bicycle forward of a bottom bracket shell of the frame; and extending a drive chain between the drive sprocket, a pedal crank, and a rear sprocket of a rear wheel of the non-electric bicycle, thereby interconnecting the electric motor and the drive chain to transmit the drive of the electric motor to the rear wheel.

According to an embodiment, mounting the electric propulsion system includes disposing the drive sprocket axis and the motor shaft axis forward of an axis of the bottom bracket shell of the frame.

According to an embodiment, there is also provided increasing a torque of the drive transmitted to the rear wheel by rotatably engaging the driven member with the output end of the motor output shaft.

In yet another aspect, there is provided an electric bicycle, comprising: a frame to which a front wheel and a rear wheel are rotatable mounted and having a bottom bracket shell fixed to a bottom end of the frame, a longitudinally extending centerline plane bisecting the frame and defining a first side and a second side of the bicycle disposed on opposed transverse sides of the plane; a drive train having a crank shaft extending between the first and second sides and mounted within the bottom bracket shell, a pedal crank mounted to the crank shaft on the second side, the crank shaft and the pedal crank being rotated about a common crank shaft axis by a pedaling actuation, and a drive chain extending between and engaging the pedal crank and a rear sprocket of the rear wheel to transmit the pedaling actuation to the rear wheel; and an electric propulsion system mounted to the frame, the electric propulsion system comprising: an electric motor having a motor output shaft rotatable about a motor shaft axis, the motor output shaft defining an output end on the first side; and a transmission interconnecting the electric motor and the drive chain to transmit a drive of the electric motor to the rear wheel, the transmission having a rotatable driven member disposed on the first side and rotatably engaged with the output end of the motor output shaft to be rotated by the drive of the electric motor, and a drive sprocket disposed on the second side and rotatable about a drive sprocket axis disposed forward of both the motor shaft axis and the crank shaft axis, and the motor shaft axis is disposed forward of the crank shaft axis, the drive sprocket connected to the driven member by a transversely extending transmission shaft, the drive sprocket engaging the drive chain to transmit the drive of the electric motor thereto.

In yet another aspect, there is provided an electric bicycle, comprising: a frame to which a front wheel and a rear wheel are rotatable mounted and having a bottom bracket shell fixed to a bottom end of the frame, a longitudinally extending centerline plane bisecting the frame and defining a first side and a second side of the bicycle disposed on opposed transverse sides of the plane; a drive train having a crank shaft extending between the first and second sides and mounted within the bottom bracket shell, a pedal crank mounted to the crank shaft on the second side, the crank shaft and the pedal crank being rotated about a common crank shaft axis by a pedaling actuation, and a drive chain extending between and engaging the pedal crank and a rear sprocket of the rear wheel to transmit the pedaling actuation to the rear wheel; and an electric propulsion system mounted to the frame, the electric propulsion system comprising: a housing encasing an electric motor and the transmission, and a support bracket, the housing being mounted to the frame forward of the bottom bracket shell with the support bracket; the electric motor having a motor output shaft rotatable about a motor shaft axis, the motor output shaft defining an output end on the first side; and a transmission interconnecting the electric motor and the drive chain to transmit a drive of the electric motor to the rear wheel, the transmission having a rotatable driven member disposed on the first side and rotatably engaged with the output end of the motor output shaft to be rotated by the drive of the electric motor, and a drive sprocket disposed on the second side and rotatable about a drive sprocket axis disposed forward of the crank shaft axis, the drive sprocket connected to the driven member by a transversely extending transmission shaft, the drive sprocket engaging the drive chain to transmit the drive of the electric motor thereto.

In yet another aspect, there is provided an electric propulsion system mountable to a bicycle have a frame to which are rotatable mounted a front wheel and a rear wheel, comprising: a housing mountable to the frame, the housing having a first side and a second side disposed on opposed transverse sides of a longitudinally extending centerline plane bisecting at least one of the housing and the frame; an electric motor disposed within the housing and having a motor output shaft rotatable about a motor shaft axis, the motor output shaft defining an output end disposed within the housing on the first side; and a transmission interconnecting the electric motor and a drive chain of the bicycle to transmit a drive of the electric motor to the rear wheel, the transmission having a rotatable driven member disposed within the housing on the first side and rotatably engaged with the output end of the motor output shaft to be rotated by the drive of the electric motor, and a drive sprocket disposed outside the housing on the second side and rotatable about a drive sprocket axis disposed forward of an axis of a bottom bracket shell of the frame, the drive sprocket connected to the driven member by a transversely extending transmission shaft disposed within the housing, the drive sprocket engaging the drive chain to transmit the drive of the electric motor thereto.

In yet another aspect, there is provided an electric propulsion system mountable to a bicycle have a frame to which are rotatable mounted a front wheel and a rear wheel, comprising: a housing having a support bracket, the housing being mountable to the frame at a distance from a bottom bracket shell of the frame with the support bracket, the housing having a first side and a second side disposed on opposed transverse sides of a longitudinally extending centerline plane bisecting at least one of the housing and the frame; an electric motor disposed within the housing and having a motor output shaft rotatable about a motor shaft axis, the motor output shaft defining an output end disposed within the housing on the first side; and a transmission interconnecting the electric motor and a drive chain of the bicycle to transmit a drive of the electric motor to the rear wheel, the transmission having a rotatable driven member disposed within the housing on the first side and rotatably engaged with the output end of the motor output shaft to be rotated by the drive of the electric motor, and a drive sprocket disposed outside the housing on the second side and rotatable about a drive sprocket axis, the drive sprocket connected to the driven member by a transversely extending transmission shaft disposed within the housing, the drive sprocket engaging the drive chain to transmit the drive of the electric motor thereto.

In another aspect, there is provided an electric propulsion system mountable to a bicycle have a frame to which are rotatable mounted a front wheel and a rear wheel, comprising: a housing mountable to the frame, the housing having a first side and a second side disposed on opposed transverse sides of a longitudinally extending centerline plane bisecting at least one of the housing and the frame; an electric motor having an operating capacity between about 250 W and about 2,000 W and disposed within the housing and having a motor output shaft rotatable about a motor shaft axis, the motor output shaft defining an output end disposed within the housing on the first side; and a transmission interconnecting the electric motor and a drive chain of the bicycle to transmit a drive of the electric motor to the rear wheel, the transmission having a rotatable driven member disposed within the housing on the first side and rotatably engaged with the output end of the motor output shaft to be rotated by the drive of the electric motor, and a drive sprocket disposed outside the housing on the second side and rotatable about a drive sprocket axis, the drive sprocket connected to the driven member by a transversely extending transmission shaft disposed within the housing, the drive sprocket engaging the drive chain to transmit the drive of the electric motor thereto.

DESCRIPTION OF THE DRAWINGS

Reference is now made to the accompanying figures in which:

FIG. 5A is a perspective view of the electric propulsion system of FIG. 1A;

FIG. 5B is another perspective view of the electric propulsion system of FIG. 1A;

FIG. 5C is yet another perspective view of the electric propulsion system of FIG. 1A;

FIG. 6 is a perspective view of an electric propulsion system according to yet another embodiment of the present disclosure, showing a pulley driven member engaging a pulley output end of a motor output shaft;

FIG. 7 is a perspective view of an electric propulsion system according to yet another embodiment of the present disclosure, showing a geared driven member engaging a geared output end of a motor output shaft;

FIG. 8 is a perspective view of an electric propulsion system according to yet another embodiment of the present disclosure, showing a sprocket driven member engaging a sprocket output end of a motor shaft;

FIG. 8A is another perspective view of the electric propulsion system of FIG. 8 having a transmission chain extending between the sprocket driven member and the sprocket output end;

FIG. 9A is a perspective view of an electric propulsion system according to yet another embodiment of the present disclosure, shown from a first side of a housing;

FIG. 9B is a perspective view of the electric propulsion system of FIG. 9A, shown from a second side of the housing;

FIG. 9C is a side view of the electric propulsion system of FIG. 9B, shown from the second side of the housing; and FIG. 10 is a perspective exposed view of a propulsion system according to yet another embodiment mounted to a frame of a bicycle.

DETAILED DESCRIPTION

Figure 1A:
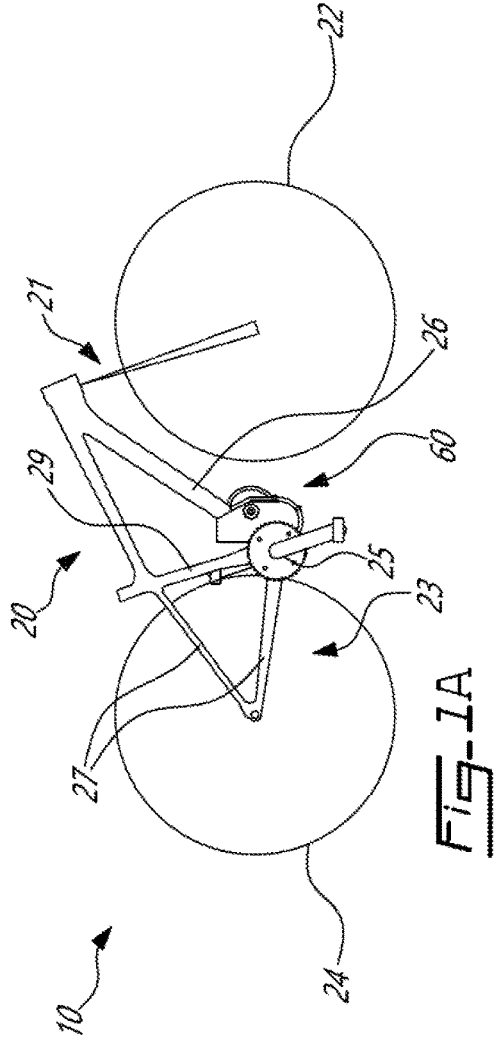
FIG. 1A is a schematic side elevation view of an electric bicycle having an electric propulsion system, according to an embodiment of the present disclosure.
Figure 1C:
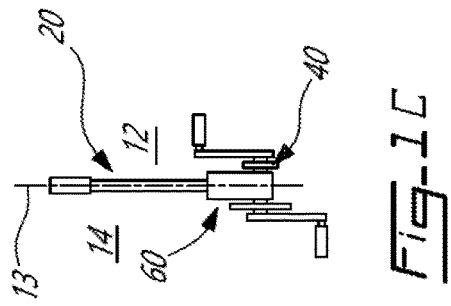
FIG. 1C is a schematic front elevation view of a frame of the electric bicycle of FIG. 1A.
Figure 1B:
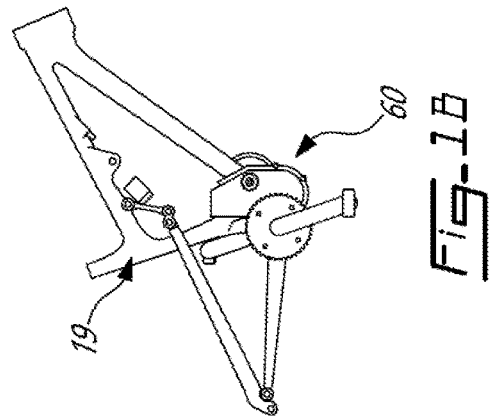
FIG. 1B is a schematic side elevation view of a frame of another electric bicycle according to another embodiment of the present disclosure, having the electric propulsion system of FIG. 1A.

FIGS. 1A and 1B illustrate an electric bicycle 10. By "electric", it is understood that the bicycle 10 can be partially or entirely driven by a motive force supplied by an electric motor, or which can be wholly driven only by pedal power when desired. The motive force can therefore also be disengaged so that the bicycle 10 can be driven entirely by the pedalling actuation force generated by the user. As can be seen by comparing FIGS. 1A and 1B, the bicycle 10 can take many different configurations, and have a different frame and configuration of components than that shown in the figures, provided that it remains at least partially electrically-driven by an electric propulsion system as will be described below. The electric bicycle 10 may be either configured to be a road or city bike, or a mountain bike.

As best seen in FIG. 1C, the bicycle 10 defines generally a first lateral side 12 and an opposed second lateral side 14. The lateral sides 12,14 (or simply "sides" 12,14) are defined by a longitudinally extending (i.e. fore-aft) centerline plane 13 running longitudinally (fore-aft) and bisecting the frame 20 of the bicycle 10 at a transverse midpoint thereof. For example, the first side 12 can be the portion of the bicycle 10 on the left-hand side of the rider when using the bicycle 10, while the second side 14 can be the portion of the bicycle 10 on the right-hand side of the rider when using the bicycle. The descriptors "first" and "second" do not limit the bicycle 10 to having only two sides, and are used only to designate the position of certain components with respect to a centerline of the bicycle 10. Other descriptors (e.g. "left", "right", "lateral", etc.) may therefore be used. The bicycle 10 has a frame 20 a drive train 40, and an electric propulsion system 60.

The frame 20 forms the corpus of the bicycle 10 and provides it with structural support so that it can be used by a rider. FIGS. 1A and 1B show two different configurations for the frame 20. For example, the frame 20 shown in FIG. 1A is suitable to be used with "hardtail" bicycles 10 (i.e. those having no suspension), while the frame 19 of FIG. 1B is one having a rear suspension system and is suitable for use with mountain bicycles 10. Many other types of frames 20 are also within the scope of the present disclosure. For example, in addition to the multi-body construction of the frames 20 of FIGS. 1A and 1B, the frame 20 can be of a unibody construction if so desired. Irrespective of its shape or configuration, the frame 20 of the present disclosure has a front frame portion 21, a rear frame portion 23, and a bottom bracket shell 25, all of which are now described in greater detail.

The front frame portion 21 forms the front of the frame 20 and includes the front wheel fork which is attached at its most forward end to the front wheel 22 of the bicycle 10, which rotates about a wheel axis. The front frame portion 21 of the main frame includes at least a down tube 26, and can also include a top tube, a seat tube, a head tube, a front-wheel suspension, etc. Indeed, the front frame portion 21 can have many other components, depending on the configuration of the bicycle 10 and its intended use, among other possible factors.

The rear frame portion 23 forms the rear of the frame 20 and is attached at its rearmost end to the rear wheel 24, which also rotates about a rear wheel axis. The rear frame portion 23 has stays 27, such as seat and chain stays, which link the rear wheel 24 to the front frame portion 21. As with the front frame portion 21, the rear frame portion 23 may include other known bicycle components including, but not limited to, a rear-wheel suspension, a rear wheel sprocket, a rear wheel hub, a derailleur, etc.

The front and rear frame portions 21,23 meet generally in the vicinity of the seat tube 29 of the frame 20, and define junctions. One such junction may formed where the down tube 26 and the chain stays 27 meet, and defines a bottom bracket shell 25. The bottom bracket shell 25 may be located elsewhere on the frame 20 at a bottom end thereof. The bottom bracket shell 25 (or simply "bottom bracket 25") is essentially a hollow tubular portion extending between the first and second sides 12,14 of the bicycle 10 along a center axis. The bottom bracket 25 receives therein a crank shaft as will be seen.

Referring to FIGS. 2A to 4, the drive train 40 is adapted to receive a pedalling actuation, or input of force, from the rider of the bicycle 10. The drive train 40 can be coupled or connected to the electric propulsion system 60, as required, so that it can complement or replace the force applied by the user. Alternatively, the drive train 40 can be decoupled or disconnected from the electric propulsion system 60 so that the rider can supply all the force required to propel the bicycle 10. The drive train 40 includes a crank shaft 41, a pedal crank 43 (ex: one or more chain rings), and a drive chain 451.

The crank shaft 41 is rotatably mounted within the bottom bracket 25 and extends transversely therethrough between the first and second sides 12,14 of the bicycle 10. The crank shaft 41 rotates about a central crank shaft axis 42, which is coincident with the axis of the bottom bracket 25 when the crank shaft 41 is disposed within the bottom bracket 25. The crank shaft 41 is therefore supported by suitable bearings so that it can rotate with respect to the stationary bottom bracket 25 about the crank shaft axis 42. In some instances, the crank shaft 41 and/or the bottom bracket 25 can have sensors 47 (see FIG. 4), which can measure and record the torque and the RPM at which the crank shaft 41 rotates, for example.

The pedal crank 43 (or simply "crank 43") can be any rotatable sprocket or sprockets which engage the drive chain 45. In so doing, the crank 43 is able to transfer the rotary force generated by the rider to the rear wheel 24 via the drive chain 45. The crank 43 is disposed on the second side 14 of the bicycle 10, and is mounted to the crank shaft 41. A freewheel clutch 46 may also be provided between the crank 43 and the crank shaft 41. Since the crank 43 is a sprocket, it can have any suitable size or shape to achieved a desired functionality. For example, the number of teeth or sprockets on the crank 43 can vary depending on the drive chain 45 being used, and the retail cost of the bicycle 10, to name but a few factors. Optionally, the number of teeth can be thirty-eight or forty-two, and cranks 43 having a different number of teeth are also within the scope of the present disclosure.

The crank arms 44 are mounted to the crank 43 in fixed engagement. The crank arms 44 transmit the pedalling force generated by the user to the drive train 40. The free ends of the crank arms 44 typically have pedals against which the feet of the rider apply force. The application of this force to the pedals by the rider creates a pedalling actuation, which is a rotation of the pedals and the crank arms 44 about the crank shaft axis 42, which in turn rotates the crank shaft 41 and the crank 43. The pedals and crank arms 44 may also be rotated in a direction which does not result in forward propulsion of the bicycle 10, either freely or in order to provide a braking action. The crank arms 44 are mounted to both extremities of the crank shaft 41 on the first and second sides 12,14 of the bicycle 10.

The drive chain 45 forms the mechanical linkage between the drive train 40, specifically the crank 43, and the rear wheel 24, specifically its rear wheel sprocket 28 mounted to the rear wheel 24 concentrically about its wheel axis. The rear sprocket 28 can include more than one sprocket 28, and can be a cassette or include a freewheel. The drive chain 45 is located on the second side 14 of the bicycle 10, which positions it on the same side of the bicycle 10 as the crank 43. Such a positioning of the drive chain 45 and crank 43 advantageously allows for a derailleur to be used with the rear sprocket 28, if so desired. It can thus be appreciated that the drive chain 45 facilitates the transfer of the pedalling actuation from the crank 43 to the rear wheel 24.

Figure 2A:
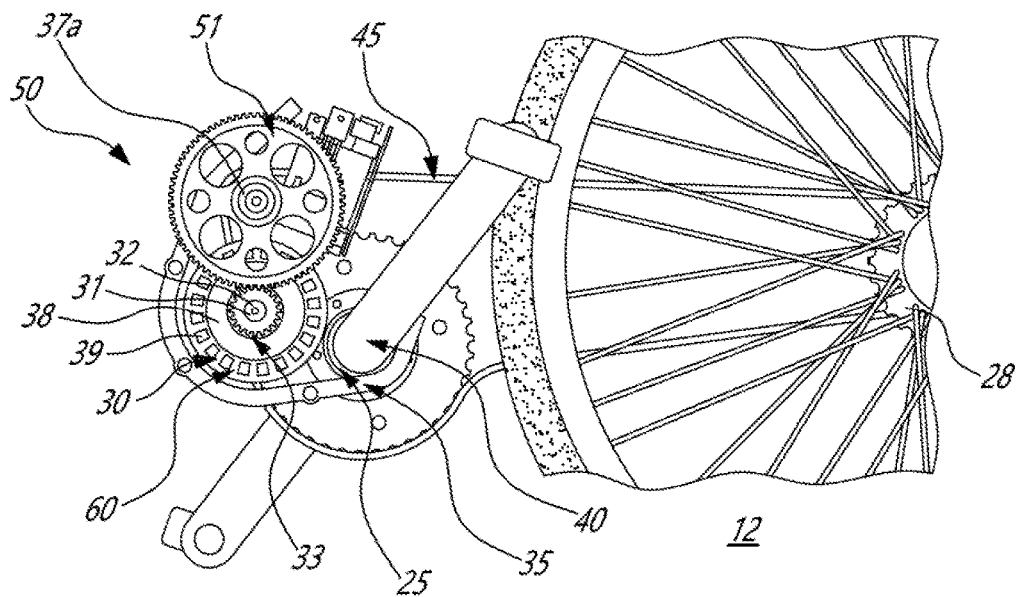
FIG. 2A is a schematic view of the interior of the electric propulsion system of FIG. 1A, shown from a first side of the electric bicycle.
Figure 2B:
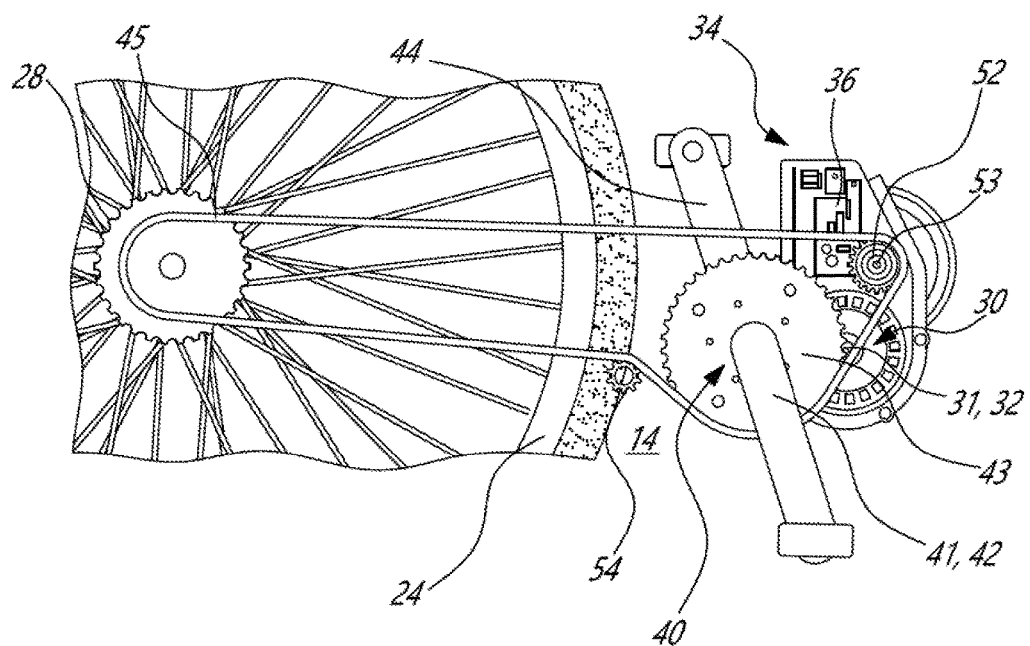
FIG. 2B is a schematic view of the interior of the electric propulsion system of FIG. 1A, shown from a second side of the electric bicycle.

Referring to FIGS. 2A and 2B, the bicycle 10 also has an electric propulsion system 60, thereby making the bicycle 10 and electric bicycle 10 (or electrically-driven bicycle 10). The electric propulsion system 60 (or simply "propulsion system 60") assists the rider of the bicycle 10 by providing an additional and complementary motive force to help the rider propel the bicycle 10 forward. The propulsion system 60 can be the sole motive force propelling the bicycle 10 forward, or a portion thereof. The bicycle 10 may therefore constitute an electrically-assisted bicycle. Alternatively, the propulsion system 60 can be decoupled so that it provides no motive force at all, whereby the bicycle 10 operates like any standard non-motorized bicycle.

As its name suggests, the propulsion system 60 is an electrical system, and thus generates its motive force, or "drive", electrically using any suitable technique. The drive provides a rotational output of power from the propulsion system 60, and specifically from its electric motor. The drive can be applied as a permanent force, or selectively by the rider. The propulsion system 60 can thus be powered by any suitable technique, such as electrochemical cells or an electrical-energy storage device. Optionally, the propulsion system 60 can employ a regenerative breaking to recharge its power source. In most arrangements, the drive produced by the propulsion system 60 is applied to the rear wheel 24 of the bicycle 10. The present propulsion system 60 is relatively compact and lightweight, such that it can be secured to the frame 20. Typically, the propulsion system 60 is mounted to the down tube 26 and/or the seat tube 29 of the front frame portion 21 of the bicycle frame 20, however it can also be mounted elsewhere on the frame 20.

The propulsion system 60 disclosed herein is separate from the bottom bracket shell 25 of the frame 20. More particularly, the propulsion system 60 is mounted to a part of the frame 20 which is at a distance from, and thus separate from, the bottom bracket shell 25. The propulsion system 60 can therefore be mounted to non-electric bicycles so as to provide a motive force that compliments the force provided by the drive train 40, without having to disrupt or modify the existing geometry and ergonomics of the originally non-electric bicycle. The propulsion system 60 can therefore be used to retro-fit or convert a non-electric bicycle into an electric bicycle 10, as will be explained in greater detail below. This contrasts with some conventional electric propulsion systems, which must be mounted through the bottom bracket of the frame, thereby requiring a purpose-built frame configuration and thus often negatively affecting the geometry of the bicycle and the feel of the bicycle to which the user has become accustomed.

The propulsion system 60 includes generally an electric motor 30 for generating the drive, and a transmission 50 which transmits the drive of the electric motor 30 to the rear wheel 24.

Referring to FIGS. 2A and 2B, the electric motor 30 of the propulsion system 60 generates the drive which assists the rider and provides motive power to the bicycle 10. The electric motor 30 can thus be any suitable electric machine which converts electrical energy into mechanical motion. The electric motor may therefore have circuitry or electronics cards 36 which govern the power it applies, and the its operation.

The electric motor 30 can be contained within a suitable housing 34 or casing which shelters the electric motor 30 from debris, moisture, and the elements. The housing 34 can have a support bracket 35 which secures the housing 34 in place to the frame 20. The support bracket 35 can secure the housing 34 (and thus the motor 30 and the transmission 50) to the frame 20 at a distance from the bottom bracket shell 25. The support bracket 35 can be removed in order to permit access to the electric motor 30. The electric motor 30, or the housing 34 in which it is contained, are secured to the bicycle frame 20, generally to the down tube 26 and/or the seat tube.

As best seen in FIGS. 2A-2B, the electrical output of the electric motor 30 generates mechanical motion. The electric motor 30 has a rotor 38 which rotates within a stator 39 inside of the housing 34. A motor output shaft 31 rotates with the rotor 38, thereby providing useful mechanical motion. The motor output shaft 31 (or simply "motor shaft 31") rotates about a motor shaft axis 32, which is fixed in position along with the motor shaft 31 in the housing 34 of the electric motor 30. The motor shaft axis 32 forms the centerline of the motor shaft 31 and extends along its length. The motor shaft 31 outputs the rotational mechanical motion generated by the electric motor 30, and thus has an output end 33 located within the housing 34 on the first side 12 of the bicycle 10. As will be discussed below, many configurations of the output end 33 are within the scope of the present disclosure. The speed of the motor output shaft 31, and thus of the output end 33, can vary. One possible range of rotational speeds at the output of the motor is between about zero and about 1,200 RPM, and other rotational speeds and ranges of rotational speeds are within the scope of the present disclosure. It can thus be appreciated that the electrical drive generated by the electric motor 30 is outputted as a mechanical drive via the output end 33, which provides motive power to the bicycle 10.

The propulsion system 60 also has a transmission 50. The transmission 50 transmits the drive generated by the electric motor 30 to the rear wheel 24 via components of the drive train 40, so that the electric drive can assist the rider in propelling the bicycle 10. If so desired. The transmission 50 also couples or decouples the electric motor 30, thereby allowing the rider to select whether or not to use the drive of the electric motor 30. The transmission 50 has a driven member 51 which is rotated by the drive of the electric motor 30 and is disposed on first side 12 of the bicycle, and a drive sprocket 52 which conveys the drive of the electric motor 30 to the rear wheel 24 and is disposed on the second side 14 of the bicycle.

The driven member 51 rotatably engages, and is driven by, the output end 33 of the motor shaft 31 of the electric motor 30. The driven member 51 is thus rotated by the drive of the motor shaft 31. It can thus be appreciated that the expression "rotatably engaged" refers to the relationship between the output end 33 and the driven member 51, in that the rotation of the output end 33 will cause the rotation of the driven member 51. The driven member 51 is disposed within the housing 34 on the first side 12 of the bicycle 10. The driven member 51 is thus located on the same side of the housing 34 as the output end 33 of the motor shaft 31, which facilitates their engagement. As will be discussed in further detail below, the configuration of the driven member 51 and how it engages the output end 33 can vary.

The drive sprocket 52 is any rotatable object having teeth which engage with the drive chain 45. The drive sprocket 52 is therefore able to advance the drive chain 45, and is also able to be rotated by the drive chain 45. Such functionality allows the drive sprocket 52 to transmit the drive output of the electric motor 30 to the drive chain 45, and ultimately, to the rear wheel 24. The drive sprocket 52 rotates about itself and a central drive sprocket axis 53, and is located on the second side 14 of the bicycle 10. The drive sprocket 52 is thus located on the same side of the bicycle as the crank 43 and the drive chain 45, which helps it to better engage with these two components. The drive sprocket 52 is connected to the driven member 51 via a transversely extending transmission shaft 55, and thus the drive sprocket axis 53 of the drive sprocket 52 is coaxial with the axis of the driven member 51 and of the transmission shaft 55. The transmission shaft 55 therefore allows the driven member 51 to transmit the drive of the electric motor 30 to the drive sprocket 52 on the opposite side of the frame. The drive train 40 may also further include an idler gear 54, which is essentially a sheltered sprocket. The idler 54 keeps the two segments of the drive chain 45, which are created when the drive chain 45 wraps around the rear sprocket 28, oriented parallel to one another along a radius of the rear wheel 24. In so doing, the idler 54 helps to reduce slack in the drive chain 45.

Referring still to FIGS. 2A and 2B, the drive sprocket axis 53 of the transmission 50 is located forward (i.e. closer to the front wheel 22 of the bicycle 10) of at least the crank shaft axis 42. The drive sprocket axis 53 is therefore forward-mounted relative to the crank shaft axis 42.

This relationship of the axes 53,42 helps to reduce the torque, and thus the stress caused thereby, which acts on the crank 53. In so doing, the disposition of the axes 53,42 allows an electric motor 30 having a relatively high power rating (and thus capable of providing greater torque) to be used in the propulsion system 60. Indeed, the electric motor 30 of the present propulsion system 60 may have an operating capacity between about 250 W to about 2,000 W. More particularly, the operating capacity can be in the range of 1,100 W to about 2,000 W. Further optionally, the operating capacity can be about 1,500 W, which is much greater than the maximum capacity of many conventional electric motors which can be in the range of 250 to 1,000 W.

This relationship of the axes 53,42 provides greater flexibility as to the location of the propulsion system 60 on the frame 20, in that it does not need to be mounted to the bottom bracket shell 25. As explained below, this allows the bicycle 10 to keep its existing geometry as well as the configuration of its components (e.g. suspension systems, etc.). This separation of the bottom bracket 25 and the propulsion system 60 is made possible by positioning the drive sprocket axis 53 (and thus the drive sprocket 52) forward of the crank shaft axis 42. This is in contrast to some conventional electric motors whose outputs are coaxial with the axis of the bottom bracket. Such conventional electric motors, regardless of how compact they may be, require that the bottom bracket shell be moved forward (and sometimes enlarged) to accommodate the relatively bulky electric motor and gear train. This quite significantly changes the overall geometry of the bicycle frame and may require modifications to suspension systems, handle bars, seat posts, and other components of the bicycle.

This relationship of the axes 53,42 is better visually appreciated in FIG. 2B. As can be seen, the drive sprocket axis 53 (i.e. the axis perpendicular to the page at the center of the drive sprocket 52) is positioned furthest away from the rear wheel 24 (and thus closest to the front wheel 22) relative to both the motor shaft axis 32 (i.e. the axis perpendicular to the page at the center of the motor shaft 31) and the crank shaft axis 42 (i.e. the axis perpendicular to the page at the center of the crank shaft 41). Optionally, the motor shaft axis 32 can be positioned between the drive sprocket axis 53 and the crank shaft axis 42. More particularly, the motor shaft axis 32 can be positioned closer to the front wheel 22 than the crank shaft axis 42, and still rearward of the drive sprocket axis 53. Additionally, as seen in FIG. 2B, the drive sprocket axis 53 may be positioned higher up (i.e. closer towards the top tube of the frame 20 or furthest away from the ground) than both the motor shaft axis 32 and the crank shaft axis 42. As a result, the drive sprocket 52 is positioned such that it applies torque on the drive chain 45 at a point which is "upstream" of the pedal crank 43 relative to a direction of rotation of the drive chain 45. Accordingly, the torque applied to the drive chain 45 by the electric motor 30, which is transmitted to the drive chain 45 via the drive sprocket 52, is directly transmitted to the rear wheel sprocket 28 without any intervening elements of the drive train 40.

Figure 3:
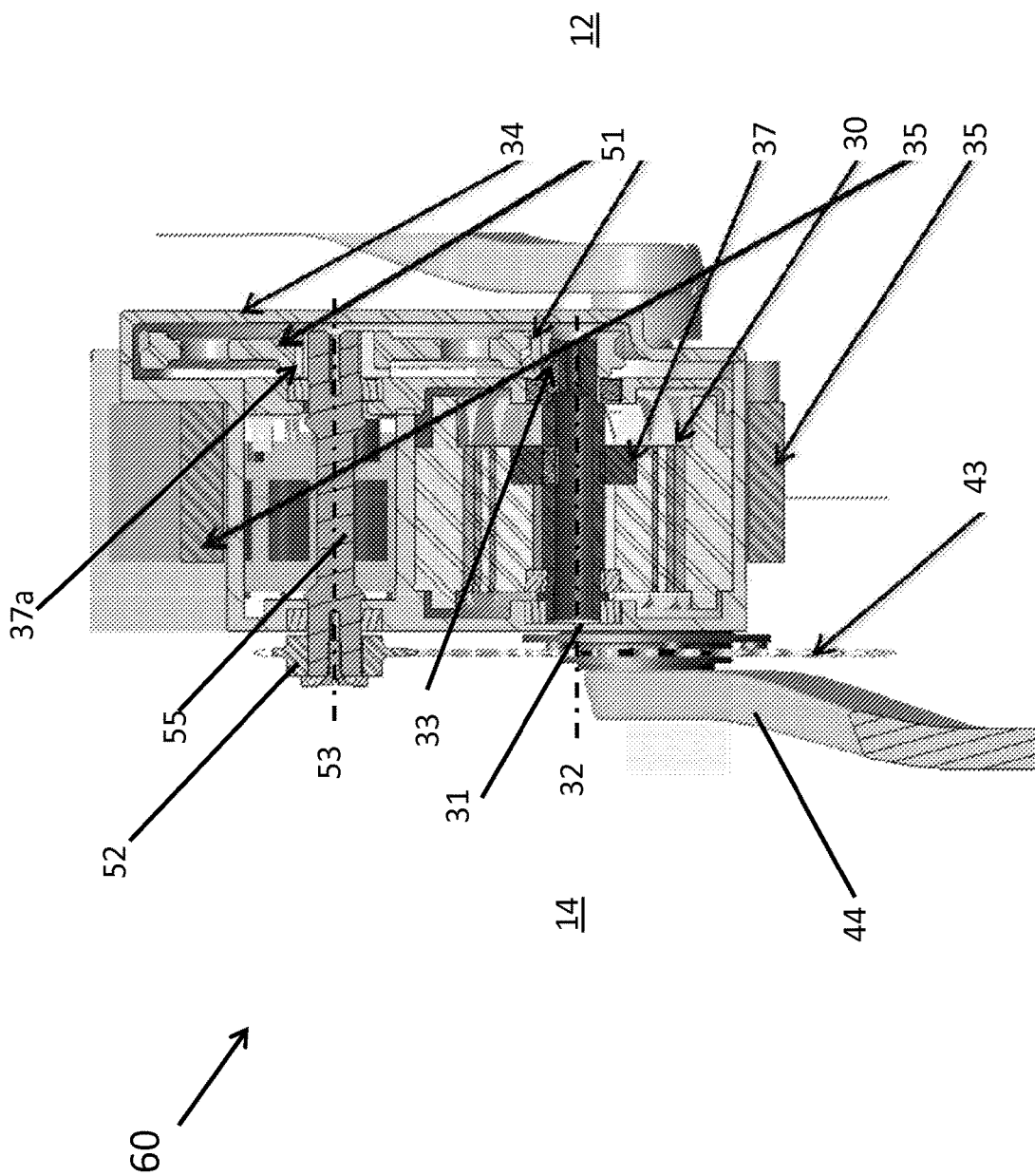
FIG. 3 is a transverse cross-sectional view of the electric propulsion system of FIG. 1A.

In some embodiments, the propulsion system 60 allows the rider to selectively decouple the electric motor 30 so that it no longer provides its drive to the rear wheel 24. Such functionality can be achieved with a clutch bearing 37, an example of which is shown in FIG. 3, which is operable to selective engage (i.e. couple or un-couple) the electric motor drive. The clutch bearing 37 is mounted concentrically about the motor output shaft 31 and is located within the housing 34. In operation, the clutch bearing 37 allows the rider to engage the electric motor 30, or some internal component thereof, so that the electric motor 30 drives the rotation of the motor output shaft 31. This can be done, for example, when the rider and the bicycle 10 are climbing a hill and the additional drive provided by the electric motor 30 is desired. The clutch bearing 37 also allows the rider to disengage the electric motor 30 from the remainder of the transmission 50, so that the electric motor 30 no longer rotates the motor output shaft 31 and the drive is no longer outputted to the transmission 50. In this case, the motor shaft 31 will thus rotate freely in response to the rotation of the driven member 51, which is itself being driven indirectly by the drive chain 45.

An additional free wheel or ratchet/clutch bearing 37a may also be provided within the transmission 50. For example, the transmission clutch bearing 37a can be mounted concentrically about the drive sprocket axis 53 between the transmission shaft 55 and the driven member 51. As with the clutch bearing 37, the transmission clutch bearing 37a allows the rider to select whether they desire the assistance of the drive of the electric motor 30, or whether they wish to pedal the bicycle 10 with no assistance from the electric motor 30. The positioning of the transmission clutch bearing 37a between the transmission shaft 55 and the driven member 51 allows the rider to provide the pedalling input without assistance from the drive of the electric motor 30. The pedalling input and the resulting rotation of the drive sprocket 52 will therefore not cause the driven member 51 or the motor shaft 31 to rotate, and the transmission clutch bearing 37a therefore contributes to lowering the number of interconnected gear ratio pieces that rotate. The transmission clutch bearing 37a therefore helps to ensure that the rider will be able to pedal the bike without having the additional restriction of the electric motor 30 that would otherwise rotate, thereby generating a magnetic field which can restrict the rotation of the rotor 38, which works against the rider. It also allows the rider to provide the pedalling input without engaging, and thus moving, mechanical gearing reduction parts.

Figure 4:
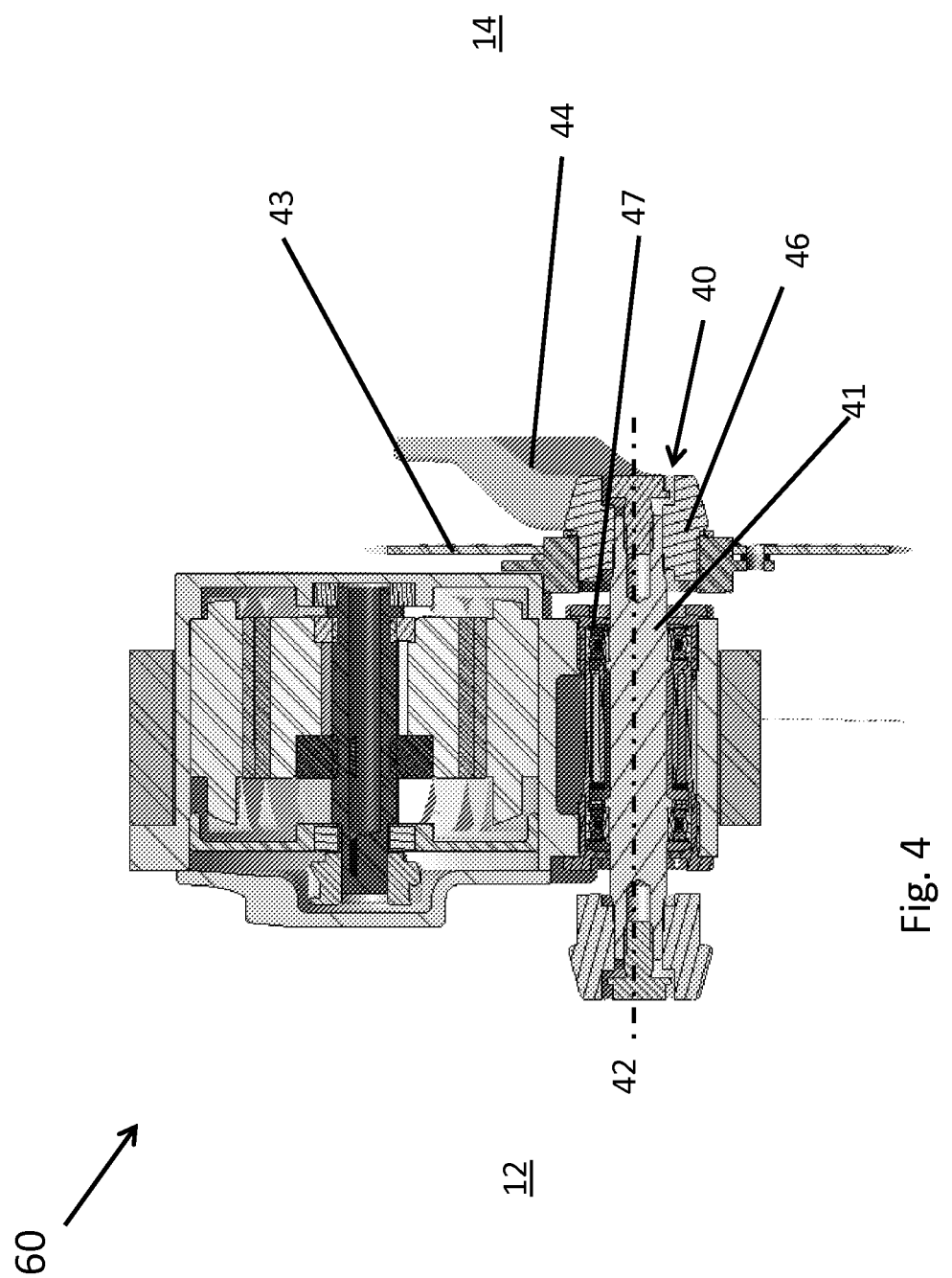
FIG. 4 is another cross-sectional view of the electric propulsion system of FIG. 1A.

It may also be desirable to allow the rider to coast by not having to rotate the crank arms 44. In these instances, the drive train 40 can have a freewheel 46, an example of which is shown in FIG. 4. The freewheel 46 is mounted concentrically about the crank shaft axis 42 between the crank shaft 41 and the crank 43, on the second side 14 of the bicycle 10. As such, it can be appreciated that the freewheel 46 allows the crank 43 to rotate independently of the crank shaft 41 and the crank arms 44, which may be desired when the rider is coasting. When coasting, the rider does not rotate the crank arms 44, and thus, does not rotate the crank shaft 41. In order to permit continued forward movement of the bicycle 10, the freewheel 46 allows the crank 43 itself to rotate, and to thus drive the drive chain 45 and the rear wheel 24.

Although described above as a clutch bearing 37 and a freewheel 46, it will be appreciated that these components can be any suitable mechanism capable of the above-described functionality. They can therefore be a ratchet bearing, a fly wheel, or an overrunning clutch, to name but a few examples. Furthermore, the integration of the clutch bearing 37 and the freewheel 46 into the electric motor 30 and the drive train 40, respectively, further contributes to the compactness of the overall propulsion system 60 while minimizing its complexity.

FIGS. 5A to 5C show the drive train 40 and the propulsion system 60 in isolation, on both the first and second sides 12,14 of the plane 13. The internal components (e.g. the electric motor 30, most of the transmission 50, etc.) of the propulsion system 60 are housed within the motor housing 34 and therefore hidden from view. The drive sprocket 52, however, is disposed outside of the housing 34 on the second side 14 thereof. The drive chain is removed for clarity, but it will be appreciated that the drive sprocket 52 is on the same side as the crank 43. The support bracket 35 is shown on the exterior of the housing 34, and is used to mount the housing 34 and its components (i.e. the electric motor 30 and transmission 50) to the frame of the bicycle at a distance from the bottom bracket 25. The relative disposition of the motor shaft axis 32, the crank shaft axis 42, and the drive sprocket axis 53 are shown. More particularly, the drive sprocket axis 53 is forward of the motor shaft axis 32, which is itself forward of the crank shaft axis 42 (i.e. of the bottom bracket shell 25).

Having described at least some of the components of the propulsion system 60, some possible embodiments of the transmission 50 will now be described in greater detail in reference to FIGS. 6 to 8.

FIG. 6 shows a transmission 150 employing pulleys and a belt. Specifically, the transmission 150 has a pulley driven member 151 which is rotatably engaged with a pulley output end 133 of the motor shaft 31 via a belt. The rotation of the pulley output end 133 drives the belt, which in turn rotates the pulley driven member 151. The rotation of the components can also be reversed, in that the pulley driven member 151 can rotate the pulley output end 133.

FIG. 7 shows a transmission 250 employing helical gears. Specifically, the transmission 250 has a geared driven member 251 (i.e. a transmission gear) which is rotatably engaged, or meshed, with a geared output end 233 of the motor shaft 31. The rotation of the geared output end 233 rotates the geared driven member 251. The rotation of the components can also be reversed, in that the geared driven member 251 can rotate the geared output end 233.

FIGS. 8 and 8A show a transmission 350 employing sprockets and a chain. Specifically, the transmission 350 has a sprocket driven member 351 which is rotatably engaged with a sprocket output end 333 of the motor shaft 31 via a transmission chain 357. The rotation of the sprocket output end 333 drives the transmission chain 357, which in turn rotates the sprocket driven member 351. The rotation of the components can also be reversed, in that the sprocket driven member 351 can rotate the sprocket output end 333. FIGS. 8 and 8A also show the transmission clutch bearing 37a within the driven member 351, which allows the rider to pedal the bicycle 10 without the assistance of the electric motor 30.

In light of the preceding, it will be appreciated that the transmission 50 disclosed herein can take many different configurations in order to transmit the drive of the electric motor 30 to the rear wheel 24. Irrespective of the configuration it assumes, the transmission 50 can also provide a multiplication of the torque generated by the electric motor 30 and applied to the driven member 51, then to drive sprocket 52, then to the drive chain 45, and ultimately, to the rear wheel 24.

This multiplication of the torque can be achieved by varying the diameter or gear ratio between the output end 33 of the motor shaft 31 and the driven member 51 with which it is rotatably engaged. This may involve using a driven member 51 which has a larger diameter than the diameter of the output end 33 of the motor shaft 31. For example, and as shown in FIGS. 9A to 9C, when the transmission 250 employs helical gears, the geared output end 233 meshed with the geared driven member 251 can have a gear ratio which may, in at least one embodiment of the present disclosure, be a gear ratio of 1:4. Therefore, if the electric motor 30 rotates the motor shaft 31 at about 1,200 RPM, the output end 233 will also rotate at about 1,200 RPM while the driven member will rotate at about 300 RPM. Similarly, if the electric motor 30 rotates the motor shaft 31 at a torque of about 15 ft-lbs, the output end 233 will also rotate at about 15 ft-lbs while the driven member will rotate at about 60 ft-lbs. Other components of the drive train 40 or transmission 50 can also be adapted to increase torque or to add rotational speed. For example, the diameter of drive sprocket 52 can be modified in order to increase torque, or to add rotational speed. It will be appreciated that other suitable gear ratios are within the scope of the present disclosure provided that they increase the torque generated by the electric motor 30.

Having described some of the possible embodiments of the propulsion system 60, a possible use of the propulsion system 60 by a rider of the bicycle 10 will now be described. When the rider wishes to avail themself of the drive of the electric motor 30, they may activate the clutch bearing 37 by toggling a switch on the handlebar of the bicycle 10, for example. The rider thereby couples the electric motor 30 or one of its components to the motor shaft 31 such that the electric motor 30 rotates the motor shaft 31. The rotation of the motor shaft 31 causes the rotation of the driven member 51, which also multiplies the torque generated by the electric motor 30. This multiplied torque is transmitted, via the transmission shaft 55, to the drive sprocket 52. The drive sprocket 52 then transfers this multiplied torque to the drive chain 45, which engages the rear wheel 24 and thus transfers the multiplied torque thereto. When the rider wishes to not use the drive of the electric motor 30, they simply toggle the switch again. In so doing, the rider instructs the clutch bearing 37 to decouple the electric motor 30 or one of its components from the motor shaft 31. The motor shaft 31 therefore no longer receives (and thus, no longer transmits) the drive of the electric motor 30. The rider is therefore free to supply their own motive force to the drive train 40 via the crank arms 44.

In light of the preceding, it can be appreciated that the propulsion system 60 disclosed herein is relatively compact, and provides a greater thrust-to-weight ratio, when compared to many conventional systems. Indeed, the positioning of certain components on either the first or second sides 12,14 of the bicycle 10 allow for better cooperation of these components while minimising the volume of space they would occupy were they to be placed elsewhere.

Furthermore, the propulsion system 60 disclosed herein can be used with existing frames and drive trains to provide electric motive force thereto. The propulsion system 60 can therefore be retrofitted to existing bicycles 10 by simply replacing very few of the components of the existing drive train (e.g. crank, chain, pedal arms), while keeping the gearing and other components of the existing drive train (e.g. rear cassette, rear wheel hub, front and rear derailleurs, etc.). Additionally, the present propulsion system 60 can be integrated into an existing bicycle frame design without needing to re-position the bottom bracket thereof. As such, the existing frame geometry of the bicycle remains the same. This is advantageous, particularly for bicycles where the frame and/or suspension geometry has been carefully designed and selected for a particular application. This allows, for example, the present propulsion system 60 to be integrated into mountain bicycle frames having a rear suspension, without altering the geometry of the frame or suspension and without requiring displacement of the bottom bracket, and thus without changing the riding characteristics which are provided by the relative frame/rear-suspension geometry. The ability to integrate the propulsion system 60 into existing bicycle frame designs also advantageously allows for the sourcing of conventional frames and drive trains, thereby helping to reduce production costs. This is in contrast to certain known electrically-driven bicycles which position an electrical drive train about the hub of the rear wheel. Such a positioning of the electrical drive train typically requires that the complete drive train be replaced, and that the rear hub be adapted, thereby preventing the use of standard frames and drive trains and increasing production costs.

There is therefore disclosed herein a method for converting a non-electric bicycle into an electric bicycle. The method may also be used to retrofit non-electric bicycles to provide an additional electrical motive force to assist in displacing the bicycle. In providing such an additional electrical motive force, the electric propulsion system 60 disclosed herein converts the non-electric bicycle into an electric bicycle, such as the one disclosed herein.

The method includes providing an electric propulsion system 60, such as the one described above. The method also includes mounting the electric propulsion system 60 to the frame of the non-electric bicycle at some point on the frame which is forward of the bottom bracket shell. It can thus be appreciated that the propulsion system 60 is not mounted to the bottom bracket shell, and therefore does not alter the geometry of the frame or its suspension system. As explained above, the propulsion system 60 may be mounted to the frame using a suitable support bracket.

When the propulsion system 60 is mounted to the frame, the axes of the motor output shaft, crank shaft and/or bottom bracket shell, and drive sprocket may have the same relative position as described above. More particularly, both the drive sprocket axis and the motor shaft axis can be disposed forward of the axis of the bottom bracket shell or crank shaft. This relationship of the axes helps to reduce the torque, and thus the stress caused thereby, which acts on the pedal crank of the drive train. In so doing, the disposition of the axes allows an electric motor having a relatively high power rating (and thus capable of providing greater torque) to be used in the propulsion system 60.

Once the propulsion system 60 is mounted to the frame of the non-electric bicycle, the components of the existing drive train of the non-electric bicycle need only be connected to the propulsion system 60 to convert the non-electric bicycle into an electric one. More particularly, the method includes extending a drive chain of the existing drive train between the drive sprocket, a pedal crank, and a rear sprocket of a rear wheel of the non-electric bicycle. This interconnects the electric motor and the drive chain, allowing the drive of the electric motor to be transmitted to the rear wheel. The bicycle can therefore be propelled, in whole or in part, by the drive supplied by the electric motor of the propulsion system 60, and is therefore an electric bicycle.

Furthermore, the disposition of the axes 53,42,32 helps to lower the stress experienced by the crank 53, and therefore allow for a greater amount of torque to be applied across the drive train 40 as a whole. This can therefore allow a more powerful motor 30 to be used, and thus for more torque and/or rotational speed to applied to the rear wheel 24. For example, it has been observed that it may be possible to propel the bicycle 10 at a speed of about 25 kph with the propulsion system 60 having an electric motor 30 operating at about 900 RPM, and at a speed of about 32 kph when the electric motor 30 operates at about 1,200 RPM.

It can also be appreciated that the integration of the clutch bearing 37 and the freewheel 46 into the electric motor 30 and the crank 43, respectively, allows for the electric motor 30 and the drive train 40 to operate independently of one another.

The propulsion system 60 disclosed herein may be slightly more voluminous than some conventional electrical motor systems, but has improved versatility. More particularly, and as explained above, the propulsion system 60 can be mounted to a non-electric bicycle 10 with minimal or no modification to its existing components. Furthermore, since the propulsion system 60 is mounted to the frame of the bicycle 10, the loads generated thereby are distributed throughout the frame 20, and are not concentrated at the crank shaft as is the case with those conventional electrical motor systems whose outputs are coaxial with, or replace, the crank shaft. In addition, if the frame-mounted propulsion system 60 is removed from the frame 20, the bicycle 10 can operate as it did prior to the propulsion system 60 without having to reconfigure its components. This may not be the case with those conventional electrical motor systems whose outputs are coaxial with, or replace, the crank shaft. The removal of these conventional systems may result in the bicycle being inoperable.

This can be more clearly seen in FIG. 10. The propulsion system 160, shown with part of its housing 134 removed, is mounted to the frame 20 of the bicycle 10 at a distance from the bottom bracket shell 25. The propulsion system 160 is mounted to the frame 20 by the support bracket 135, at a junction between the down tube 26 and the seat tube. The propulsion system 160, as well as its drive sprocket 152, are thus positioned forward (i.e. toward the front wheel 22) of the bottom bracket 25 and separate therefrom. It can thus be appreciated that the propulsion system 160 does not interfere with the components of the drive train which are rotatable about the center axis of the bottom bracket 25, and can be removed from the frame 20 without negatively affect the structural integrity of the frame or the operability of the bicycle 10.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An electric bicycle, comprising:
a frame to which a front wheel and a rear wheel are rotatable mounted and having a bottom bracket shell fixed to a bottom end of the frame, a longitudinally extending centerline plane bisecting the frame and defining a first side and a second side of the bicycle disposed on opposed transverse sides of the plane;
a drive train having a crank shaft extending between the first and second sides and mounted within the bottom bracket shell, a pedal crank mounted to the crank shaft on the second side, the crank shaft and the pedal crank being rotated about a common crank shaft axis by a pedaling actuation, and a drive chain extending between and engaging the pedal crank and a rear sprocket of the rear wheel to transmit the pedaling actuation to the rear wheel; and an electric propulsion system mounted to the frame, the electric propulsion system comprising:
an electric motor having a motor output shaft rotatable about a motor shaft axis, the motor output shaft defining an output end on the first side; and
a transmission interconnecting the electric motor and the drive chain to transmit a drive of the electric motor to the rear wheel, the transmission having a rotatable driven member disposed on the first side and rotatably engaged with the output end of the motor output shaft to be rotated by the drive of the electric motor, and a drive sprocket disposed on the second side and rotatable about a drive sprocket axis disposed forward of both the crank shaft axis and the motor shaft axis, the motor shaft axis being disposed forward of the crank shaft axis, the drive sprocket connected to the driven member by a transversely extending transmission shaft, the drive sprocket engaging the drive chain to transmit the drive of the electric motor thereto.

2. The electric bicycle of claim 1, wherein the electric propulsion system has a housing encasing the electric motor and the transmission, and a support bracket, the housing being mounted to the frame forward of the bottom bracket shell with the support bracket.

3. The electric bicycle of claim 1, wherein the driven member has a greater diameter than a diameter of the output end of the motor output shaft, the rotatable engagement of the driven member and the motor output shaft increasing torque provided to the drive sprocket.

4. The electric bicycle of claim 1, wherein the drive train has a freewheel mounted concentrically between the crank shaft and the pedal crank on the second side to selectively engage the crank shaft.

5. The electric bicycle of claim 1, further comprising a clutch bearing operable to selectively engage either the motor output shaft or the transmission shaft, the clutch bearing forming part of the electric motor when the clutch bearing engages the motor output shaft and is mounted concentrically thereabout, and the clutch bearing forming part of the transmission when the clutch bearing engages the transmission shaft and is mounted concentrically about the drive sprocket axis between the transmission shaft and the driven member.

6. The electric bicycle of claim 1, wherein the drive train has an idler gear disposed between the pedal crank and the rear sprocket of the rear wheel, the idler gear keeping two segments of the drive chain about the rear sprocket oriented parallel to one another.

7. The electric bicycle of claim 1, wherein the electric motor has a capacity between about 1,100 W and about 2,000 W.

8. The electric bicycle of claim 1, wherein the rotatable driven member is disposed on the first side and is directly rotatably engaged with the output end of the motor output shaft to be rotated by the drive of the electric motor.

9. An electric propulsion system mountable to a bicycle having a frame to which are rotatable mounted a front wheel and a rear wheel, comprising:
a housing mountable to the frame, the housing having a first side and a second side disposed on opposed transverse sides of a longitudinally extending centerline plane bisecting at least one of the housing and the frame;
an electric motor disposed within the housing and having a motor output shaft rotatable about a motor shaft axis, the motor output shaft defining an output end disposed within the housing on the first side; and
a transmission interconnecting the electric motor and a drive chain of the bicycle to transmit a drive of the electric motor to the rear wheel, the transmission having a rotatable driven member disposed within the housing on the first side and rotatably engaged with the output end of the motor output shaft to be rotated by the drive of the electric motor, and a drive sprocket disposed outside the housing on the second side and rotatable about a drive sprocket axis, the drive sprocket axis being disposed forward of the motor shaft axis, and the motor shaft axis being disposed forward of an axis of a bottom bracket shell of the frame, the drive sprocket connected to the driven member by a transversely extending transmission shaft disposed within the housing, the drive sprocket engaging the drive chain to transmit the drive of the electric motor thereto.

10. The electric propulsion system of claim 9, wherein the housing has a support bracket, the housing being mountable to the frame at a distance from a bottom bracket shell of the frame with the support bracket.

11. The electric propulsion system of claim 9, wherein electric motor includes a clutch bearing mounted concentrically about the motor output shaft for selectively engaging the motor output shaft.

12. The electric propulsion system of claim 9, wherein the electric motor has a capacity between about 1,100 W and about 2,000 W.

13. The electric propulsion system of claim 9, wherein the rotatable driven member is disposed within the housing on the first side and is directly rotatably engaged with the output end of the motor output shaft to be rotated by the drive of the electric motor.

14. A method for converting a non-electric bicycle into an electric bicycle, the method comprising:
providing an electric propulsion system comprising:
an electric motor having a motor output shaft rotatable about a motor shaft axis, the motor output shaft defining an output end on a first side of the electric propulsion system; and
a transmission having a rotatable driven member disposed on the first side and rotatably engaged with the output end of the motor output shaft to be rotated by a drive of the electric motor, and a drive sprocket disposed on a second side of the electric propulsion system and rotatable about a drive sprocket axis disposed forward of both the motor shaft axis and an axis of a bottom bracket shell of the frame, the motor shaft axis being disposed forward of the axis of a bottom bracket shell, the drive sprocket connected to the driven member by a transversely extending transmission shaft;
mounting the electric propulsion system to a frame of the non-electric bicycle forward of a bottom bracket shell of the frame; and
extending a drive chain between the drive sprocket, a pedal crank, and a rear sprocket of a rear wheel of the non-electric bicycle, thereby interconnecting the electric motor and the drive chain to transmit the drive of the electric motor to the rear wheel.

15. The method of claim 14, further comprising increasing a torque of the drive transmitted to the rear wheel by rotatably engaging the driven member with the output end of the motor output shaft.

16. The method of claim 14, wherein mounting the electric propulsion system includes selectively engaging the motor output shaft.

17. The method of claim 14, wherein mounting the electric propulsion system includes selectively engaging the transmission shaft.

18. The method of claim 14, wherein mounting the electric propulsion system includes selectively engaging a crank shaft disposed within the bottom bracket shell of the frame.

* * * * *